United States Patent
Chinnappa et al.

(10) Patent No.: US 7,788,660 B2
(45) Date of Patent: Aug. 31, 2010

(54) RESOURCE ADAPTER CLASSLOADING

(75) Inventors: Codanda Ganapathy Chinnappa, Boston, MA (US); James William Gish, Sudbury, MA (US); Brian Christopher Chesebro, Londonderry, NH (US)

(73) Assignee: BEA Systems, Inc., Redwood Shores, CA (US)

( * ) Notice: Subject to any disclaimer, the term of this patent is extended or adjusted under 35 U.S.C. 154(b) by 1301 days.

(21) Appl. No.: 11/281,968

(22) Filed: Nov. 17, 2005

(65) Prior Publication Data

US 2007/0113234 A1 May 17, 2007

(51) Int. Cl.
*G06F 9/44* (2006.01)
(52) U.S. Cl. .................. 717/166; 717/151; 717/165
(58) Field of Classification Search .............. 717/166, 717/174, 175, 176, 177, 178, 165, 151; 707/203, 707/E17.032; 709/203
See application file for complete search history.

(56) References Cited

U.S. PATENT DOCUMENTS 5,410,703 A  4/1995  Nilsson et al.
5,465,328 A  11/1995  Dievendorff
6,429,860 B1 *  8/2002  Hughes ............... 345/418

(Continued)

OTHER PUBLICATIONS

Title: JMangler—A Framework for Load Time Transformation of Java Class Files, author: Gunter Kniesel et al, source: IEEE, dated: Aug. 6, 2002.*

(Continued)

*Primary Examiner*—Chameli C Das
(74) *Attorney, Agent, or Firm*—Fliesler Meyer LLP

(57) ABSTRACT

In accordance with embodiments, there are provided mechanisms and methods for loading a class with a resource adapter classloader and enabling the class to be accessible by other components that interconnect with the resource adapter. In an embodiment, a method for loading a class with a resource adapter classloader is provided that includes detecting an indicator specifying that at least one class loaded by a classloader associated with a resource adapter be made accessible to at least one other classloader. The at least one class loaded by the classloader associated with the resource adapter is made accessible to a system classloader. The at least one other classloader is permitted the capability to access the at least one class loaded by the classloader associated with the resource adapter via the system classloader.

13 Claims, 6 Drawing Sheets

U.S. PATENT DOCUMENTS

| | | | |
|---|---|---|---|
| 6,557,168 B1* | 4/2003 | Czajkowski | 717/151 |
| 6,823,519 B1 | 11/2004 | Baird | |
| 7,080,145 B2 | 7/2006 | Srivastava et al. | |
| 7,089,584 B1* | 8/2006 | Sharma | 726/4 |
| 7,418,718 B2* | 8/2008 | Liu et al. | 719/328 |
| 7,484,224 B2* | 1/2009 | Potter et al. | 719/328 |
| 7,506,338 B2* | 3/2009 | Alpern et al. | 717/177 |
| 7,506,342 B2* | 3/2009 | Mousseau et al. | 719/320 |
| 7,644,403 B2* | 1/2010 | Atsatt | 717/166 |
| 2002/0147971 A1* | 10/2002 | Adams | 717/165 |
| 2003/0061515 A1 | 3/2003 | Kindberg | |
| 2003/0093470 A1* | 5/2003 | Upton | 709/203 |
| 2004/0015859 A1* | 1/2004 | Potter et al. | 717/120 |
| 2004/0158819 A1* | 8/2004 | Cuomo et al. | 717/128 |
| 2004/0187127 A1 | 9/2004 | Gondi et al. | |
| 2004/0255294 A1* | 12/2004 | Spotwood | 717/176 |
| 2005/0003850 A1 | 1/2005 | Tsuda et al. | |
| 2005/0015425 A1 | 1/2005 | Kumar | |
| 2005/0187891 A1 | 8/2005 | Johnson | |
| 2006/0112379 A1* | 5/2006 | Chirakansakcharoen et al. | 717/166 |
| 2006/0129983 A1* | 6/2006 | Feng | 717/120 |
| 2006/0224633 A1 | 10/2006 | Fahmy et al. | |
| 2007/0061795 A1* | 3/2007 | Atsatt | 717/166 |
| 2007/0061796 A1* | 3/2007 | Atsatt | 717/166 |
| 2007/0061798 A1* | 3/2007 | Atsatt | 717/166 |
| 2010/0070960 A1* | 3/2010 | Atsatt | 717/166 |

OTHER PUBLICATIONS

Title: Secure Java Class Loading, author: Li Gang, source: IEEE, dated: Dec. 1998.*

* cited by examiner

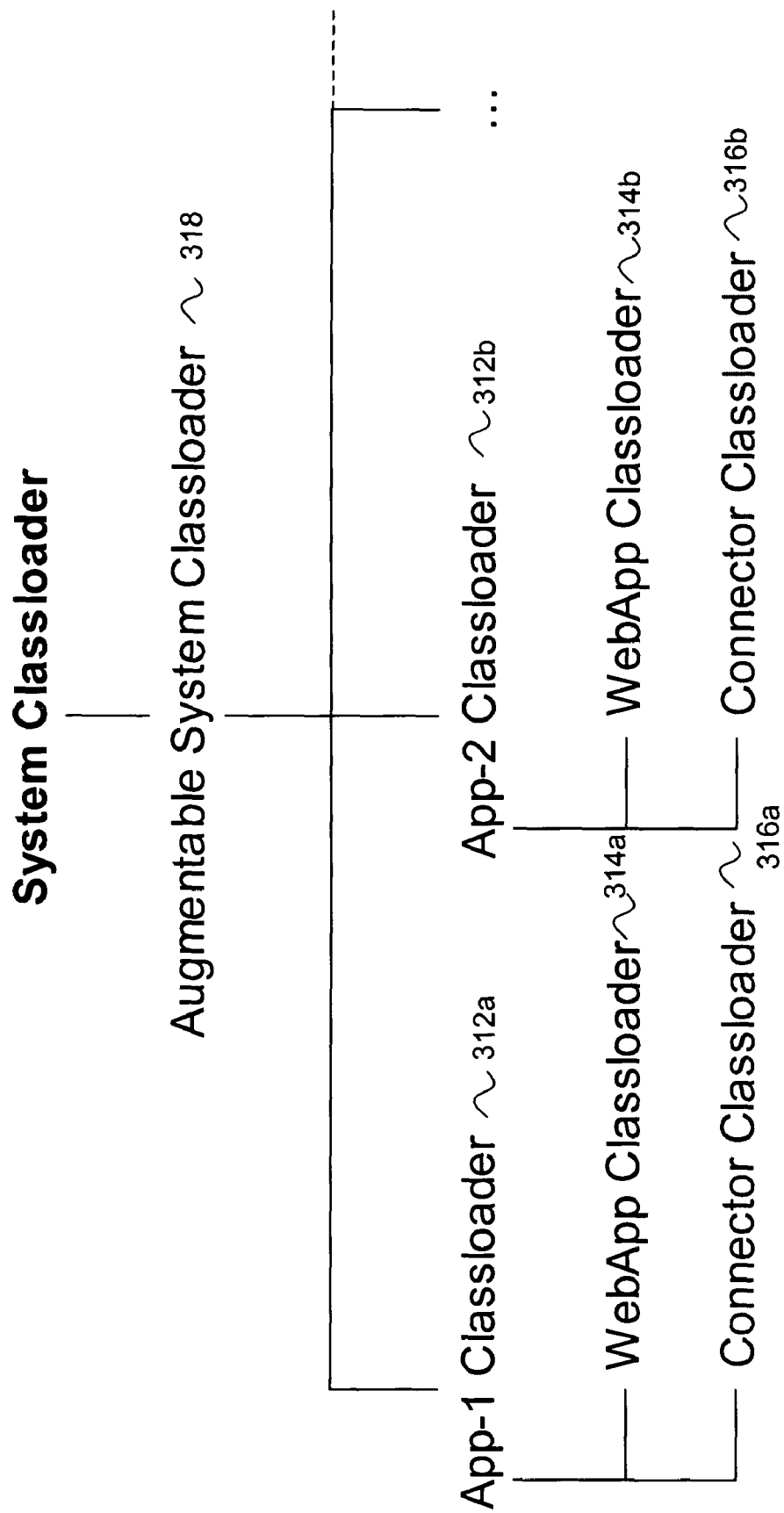

RESOURCE ADAPTER CLASSLOADING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States Patents and Patent Applications, including the present application, are related to each other. Each of the other patents/applications are incorporated by reference herein in its entirety:

U.S. patent application Ser. No. 11/282,060 entitled PRODUCTION REDEPLOYMENT, by James William Gish, et al., filed on Nov. 17, 2005;

U.S. patent application Ser. No. 11/281,831 entitled METHOD AND COMPUTER READABLE MEDIUM FOR SUSPENDED STATE RESOURCE ADAPTER, by James William Gish, et al., filed on Nov. 17, 2005, issued Feb. 24, 2009, as U.S. Pat. No. 7,496,705; and U.S. patent application Ser. No. 11/416,906 entitled RECOVERY MECHANISM FOR TRANSACTIONS, by Brian Christopher Chesebro, et al., filed on May 3, 2006.

FIELD OF THE INVENTION

The current invention relates generally to techniques for providing interconnectivity between one or more application servers and one or more enterprise information systems, and more particularly to a mechanism for loading a class with a resource adapter classloader.

BACKGROUND

Since its inception in 1995, the JAVA™ programming language has become increasingly popular. (JAVA™ is a trademark of Sun Microsystems, Inc.) JAVA, which is an interpreted language, enabled the creation of applications that could be run on a wide variety of platforms. This ability to function across a variety of different client platforms, i.e., platform independence, and JAVA's relatively easy implementation of network applications has resulted in the use of JAVA, as well as other programming languages that provide platform independence, in endeavors as basic as personal web pages to endeavors as complex as large business-to-business enterprise systems.

However, since applications, as well as the Enterprise Information Systems (EIS) to which the applications connect, may be provided by many different vendors, a mechanism that enables these disparate computational entities to communicate with one another was needed. The JAVA 2 Platform Enterprise Edition (J2EE) is a specification that addresses such needs.

J2EE Connector Architecture provides a mechanism for integrating J2EE-compliant application servers with enterprise information systems. The J2EE Connector Architecture defines a Common Client Interface (CCI) for EIS access. The CCI defines a client API that enables clients to interact with heterogeneous enterprise information systems. Application servers, i.e., servers onto which applications may be deployed, and Enterprise Information Systems need only follow a J2EE Connector Architecture specification in order to interconnect with one another.

Unfortunately, the J2EE specification does not resolve all interconnection issues. For example, the J2EE connector architecture leaves responsibility for class loading to each application server vendor. Thus, in a particular implementation components using the J2EE Connector Architecture may load a class for that component's use. What is needed is an improved mechanism for loading a class with a resource adapter classloader.

BRIEF DESCRIPTION OF THE DRAWINGS

FIGS. 3A-3C are high level overviews of example arrangements of classes for use with a technique for loading a class with a resource adapter classloader in an embodiment.

DETAILED DESCRIPTION

Figure 1:
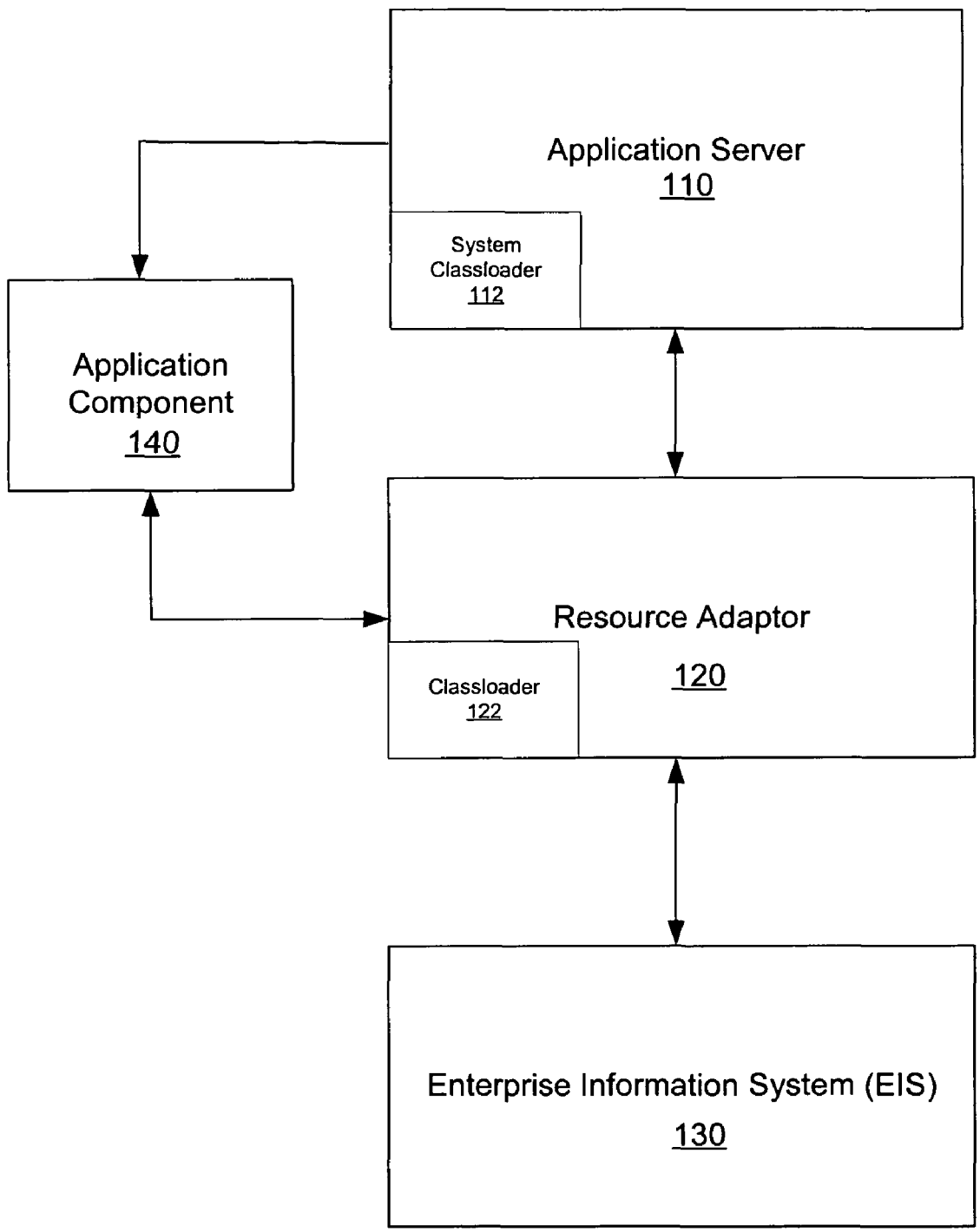
FIG. 1 is functional block diagram of an example computing environment in which techniques for loading a class with a resource adapter classloader in an embodiment may be implemented.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for loading a class with a resource adapter classloader that enable the class to be accessible by other components that interconnect with the resource adapter. These mechanisms and methods can enable embodiments to provide access to classes loaded with a resource adapter classloader to other application components. The ability of embodiments to provide access to classes loaded with a resource adapter classloader to other application components can enable components to share class information in an orderly fashion throughout a system. For example, a machine (and/or a program) that accesses a resource adapter can be provided with access to all the classes of the resource adapter.

In an embodiment, a method for loading a class with a resource adapter classloader is provided. The method embodiment includes detecting an indicator specifying that at least one class loaded by a classloader associated with a resource adapter be made accessible to at least one other classloader. This can be achieved in a variety of ways, such as for example by detecting that a tag indicating that at least one class loaded by a classloader associated with a resource adapter is to be made accessible to at least one other classloader has been set to true. The class loaded by the classloader associated with the resource adapter is made accessible to a system classloader. In an embodiment, the system classloader can be an augmentable system classloader as will be described in further detail below. In an embodiment and by way of example, classes loaded by the resource adapter classloader may be made accessible to the system classloader by loading the class with the classloader associated with the resource adapter and providing access to the added class independent of a CLASSPATH associated with the system classloader. The at least one other classloader is permitted the capability to access the at least one class loaded by the classloader associated with the resource adapter via the system classloader. This can be achieved by permitting the at least one other classloader access the added class, when the added class has been associated with the system classloader.

While the present invention is described with reference to an embodiment in which techniques for loading a class with a resource adapter classloader are implemented in conformance with the J2EE Connector Architecture using executable programs written in the JAVA™ programming language, the present invention is not limited to the J2EE Connector Architecture nor the JAVA™ programming language. Embodiments may be practiced using other interconnectivity specifications or programming languages, i.e., JSP and the like without departing from the scope of the embodiments claimed. (JAVA™ is a trademark of Sun Microsystems, Inc.)

FIG. 1 is functional block diagram of an example computing environment implementing a connector architecture in which techniques for loading a class with a resource adapter classloader in an embodiment may be implemented. As shown in FIG. 1, a connector architecture implementation 100 includes application server 110, resource adaptor 120, enterprise information system (EIS) 130, and application component 140. As used herein, the term Enterprise Information System (EIS) is defined broadly to include any computing installation that provides the information infrastructure for an enterprise. The enterprise information system 130 may be realized with virtually any type or combination of computers, computer systems and peripheral devices. The components of enterprise information system 130 may be co-located or dispersed geographically in various installations. As used herein, the term application server is defined broadly as a server computer in a computer network dedicated to running certain software applications. Application server 110 exists in conjunction with a web server (not shown in FIG. 1 for brevity) or between a web server and enterprise information system 130 to provide middleware functionality for the enterprise. As used herein, the term resource adapter is defined broadly to include any segment of code that represents an Enterprise Information System (EIS). As used herein, the term application component is defined broadly as any data entry, update, query or program that processes data on behalf of a user. Users may be human or computational entities, including proxies and the like. Embodiments implement connector architecture 100 to enable one or more applications to establish connections between the application component 140 and the EIS 130.

In one embodiment, the connector architecture implementation 100 is compatible with the JAVA 2 Enterprise Edition (J2EE) Connector Architecture. This architecture provides for an EIS vendor-provided resource adaptor and an application server, to which the resource adaptor interfaces. The J2EE Connector Architecture defines a set of contracts, such as transactions, security, and connection management, which both the resource adaptor and application server require to communicate with one another. The connector architecture 100 may be implemented in an application server and an EIS-specific resource adaptor.

Application server 110 embodiments can be configured from a variety of hardware and software products. The application server 110 may run JAVA or other programming language environment, and may be configured to provide access to resources internal to the server, as well as resources reachable by the application server 110. Resources can include applications, services, databases web sites and other computer based resources. In one embodiment, the application server 110 utilizes WebLogic® Server from BEA systems of San Jose, Calif.

As further illustrated by FIG. 1, application server 110 includes a classloader 112 for loading classes to be used by the application server 110. In an embodiment, classes loaded by classloader 112 can follow rules defining the scope of these classes to the methods and objects loaded by application server 110. Embodiments providing a hierarchical arrangement of scope will permit the classes loaded by classloader 112 to be visible to methods and objects having a relationship with application server 110 in the hierarchy, as will be described in further detail below with reference to FIGS. 3A-3C.

Resource adaptor 120 comprises a system level software driver used by application server 110 to connect to EIS 130. In an embodiment, resource adaptor 120 contains JAVA code and any native components required to facilitate interconnection between the application server 110 and the EIS 130. In one embodiment, the connector architecture 100 supports resource adaptors developed by EIS vendors and third party application developers that can be deployed in any application server according to the J2EE platform specification.

As further illustrated by FIG. 1, resource adaptor 120 includes a classloader 122 for loading classes to be used by the resource adaptor 120. In an embodiment, classes loaded by classloader 122 can follow rules defining the scope of these classes to the methods and objects loaded by resource adaptor 120. Embodiments providing a hierarchical arrangement of scope will permit the classes loaded by classloader 122 to be visible to methods and objects having a relationship with resource adaptor 120 in the hierarchy, as will be described in further detail below with reference to FIGS. 3A-3C.

The EIS 130 provides the information infrastructure for an enterprise. In various embodiments, EIS 130 may provide one or more applications, programs or processes capable of providing services to a requestor or other recipient, including without limitation network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services. The services may be exposed to clients as local or remote interfaces, or both.

Application component 140 may be at least a subset of an application, and can be implemented for example and without limitation, using an enterprise JAVA bean (EJB), JAVA Server Page (JSP), servlet, or any combination thereof, that is deployed, managed, or executed on the application server 110.

The connector architecture 100 of FIG. 1 further includes system level contracts (not shown in FIG. 1 for brevity). System level contracts govern the interactions between the resource adaptor 120 and the application server 110. The contracts may relate to connection management or other aspects of the connector architecture. Connection management contracts allow an application server the ability to provide a pool of connections to underlying EISs that enable application components to connect to an EIS. In one embodiment of the present invention, the connection management relates to connection pool configuration, connection pool management, and connection management.

Embodiments can provide the ability to make classes loaded by a particular class loader, such as resource adapter classloader 122 for example, visible to other applications and classloaders, such as application 110 for example under control of a <enable-global-access-to-classes> tag in a configuration, called weblogic-ra.xml in an embodiment. By default this tag is set to false. If the tag is set to true, however, all the classes loaded by a classloader will be made visible to the methods and objects of other applications via an augmentable classloader, as will be described in further detail below.

Figure 2:
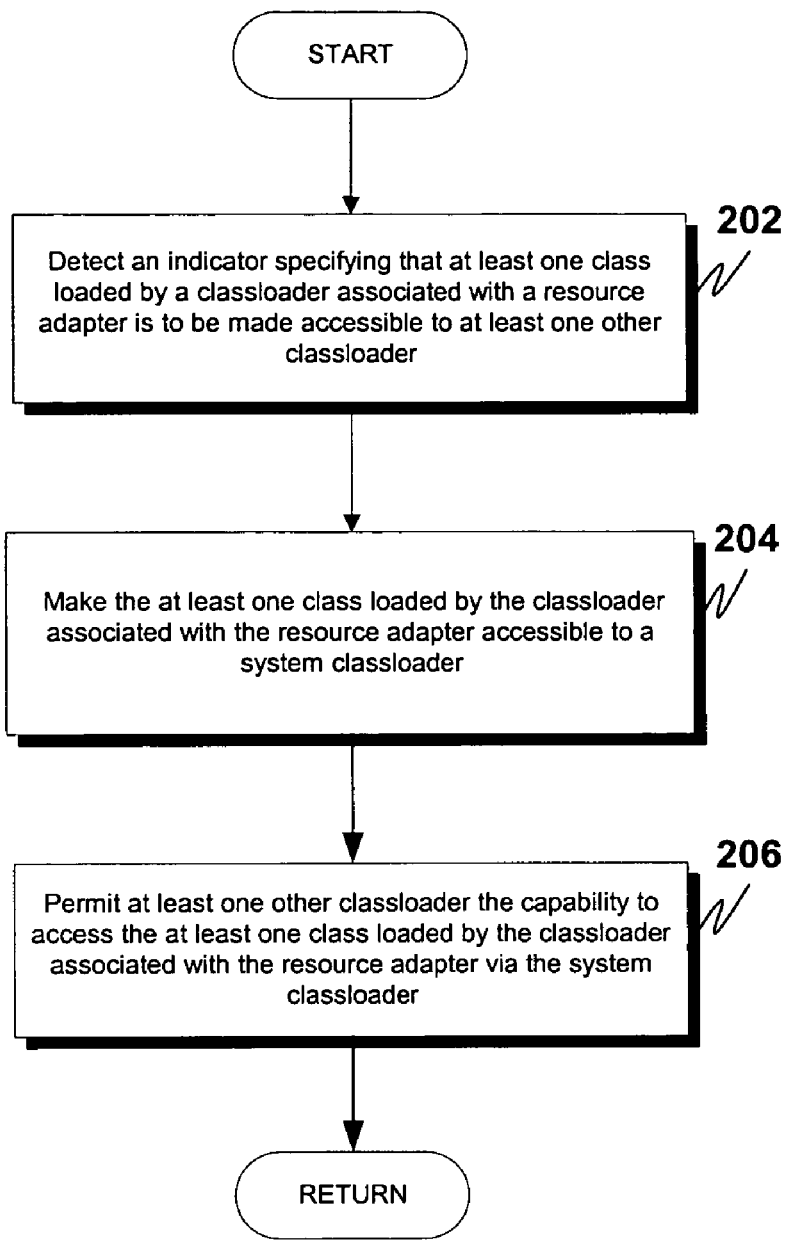
FIG. 2 is an operational flow diagram illustrating a high level overview of a technique for loading a class with a resource adapter classloader in an embodiment.

FIG. 2 is an operational flow diagram illustrating a high level overview of a technique for loading a class with a resource adapter classloader in an embodiment. The technique for loading a class with a resource adapter classloader shown in FIG. 2 is operable with an application server, application component and resource adaptor, such as application server 110, application component 140 and resource adaptor 120 of FIG. 1, for example. As shown in FIG. 2, an indicator is detected (block 202). The indicator specifies that at least one class loaded by a classloader associated with a resource adapter be made accessible to at least one other classloader. In an embodiment, detecting the indicator is achieved by detecting that a tag indicating that at least one class loaded by a classloader associated with a resource adapter is to be made accessible to at least one other classloader has been set to true. Of course, other types of indicators may be used in alternative embodiments. The at least one class loaded by the classloader associated with the resource adapter is made accessible to a system classloader (block 204). The system classloader can be an augmentable system classloader as will be described in further detail with reference to FIGS. 3A-3C below. In an embodiment, classes loaded by the resource adapter classloader may be made accessible to the system classloader by loading the class with the classloader associated with the resource adapter and providing access to the added class. In an embodiment, the class is loaded into a cache. This technique enables the class to be accessible independent of a CLASSPATH associated with the system classloader. At least one other classloader is permitted the capability to access the at least one class loaded by the classloader associated with the resource adapter via the system classloader (block 206). In an embodiment, permitting other classloaders to access the class includes permitting the at least one other classloader access the added class, when the added class has been associated with the system classloader.

Figure 3A:
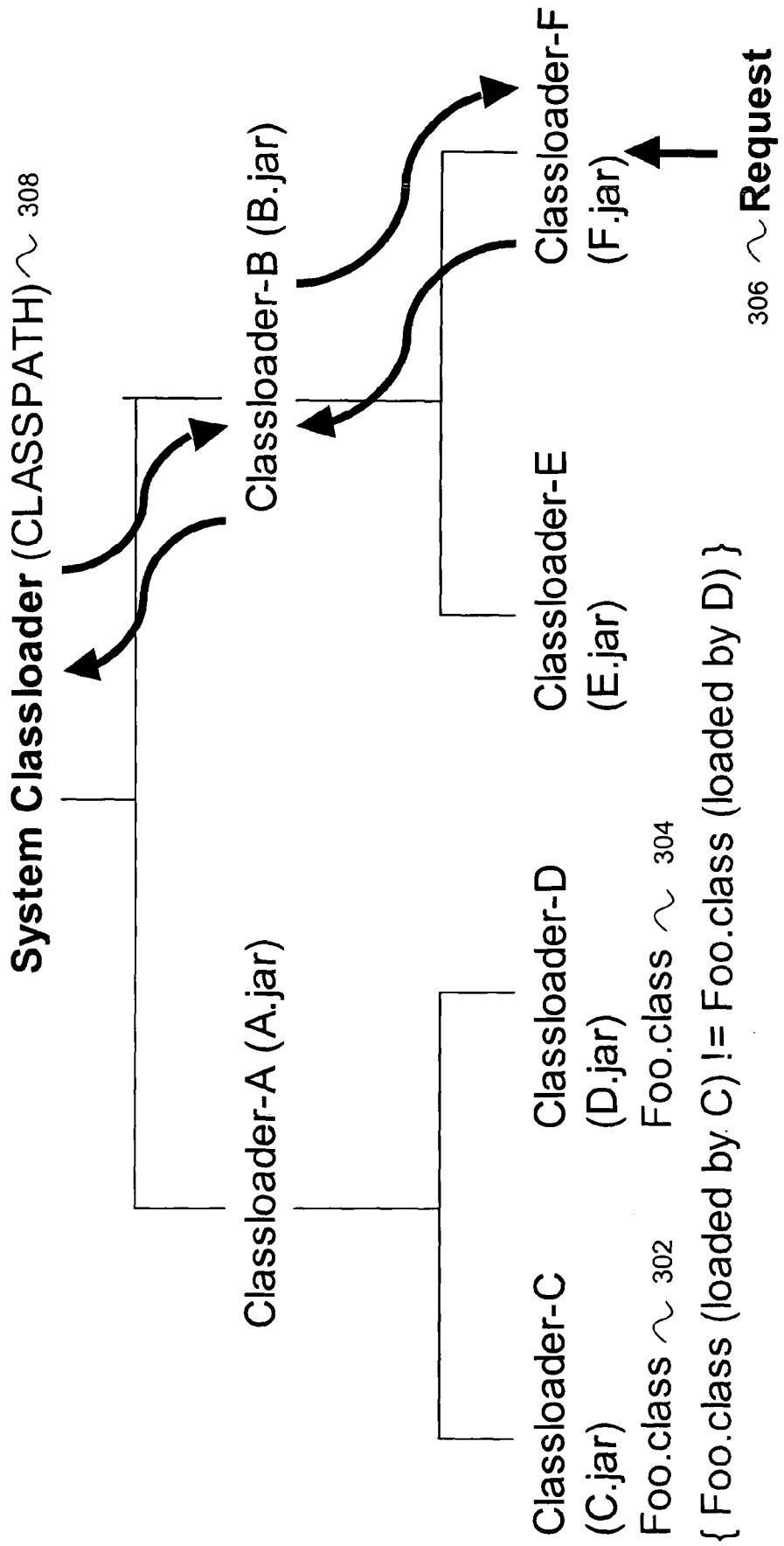
Figure 3C:
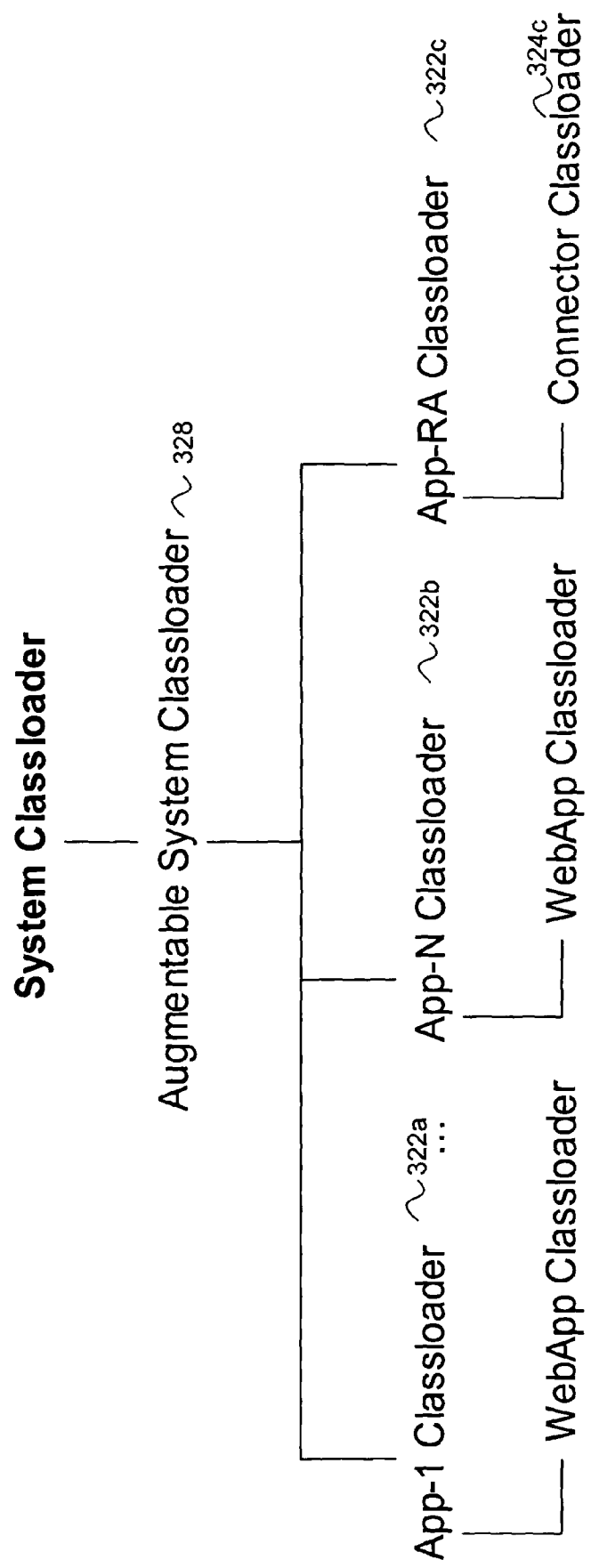

FIGS. 3A-3C are high-level overviews of arrangements of classes in which a technique for loading a class with a resource adapter classloader can be implemented in an embodiment. As shown in FIG. 3A, in an embodiment, classloaders are implemented with a hierarchical organization. Once a class is loaded by a classloader the class is stored in a cache. The loading of classes is scoped; in other words, each class is organized into a relationship with other classes according to rules defining a scope for classes associated with each classloader. A System classloader is at the head of the hierarchy. The System classloader has access to the CLASS-PATH statement.

FIG. 3A illustrates the scope of classes within an example class hierarchy. Scope rules confine visibility of the classes to the methods and objects within the scope of a classloader. For example, a class "foo" 302 loaded by one classloader, classloader "C" in FIG. 3A, is by default not made visible to methods and objects loaded by classloader "D". Thus, the class "foo" 302 loaded by classloader "C" is different from a class "foo" 304 loaded by classloader "D". Embodiments providing a hierarchical arrangement of scope permit the classes loaded by classloader "B" to be visible to methods and objects below classloader "B", such as classloader "F" in FIG. 3A. Accordingly, a child classloader, such as classloader "F", may delegate a request 306 to access a class to a parent classloader, such as classloader "B" in the hierarchy. Scoping rules can permit classes loaded by a parent classloader to be made available to methods and objects associated with a child classloader. However, if an application developer desired to make classes loaded by one application classloader accessible and/or visible to methods and objects associated with a second application, conventionally, classes to be loaded by the child classloader would need to be placed in the CLASS-PATH statement 308.

As shown in FIG. 3B, in an embodiment and by way of example, applications within the connector framework 100 may also implement classloaders to load classes for use by the application. In an installation in which different applications, i.e., App-1 and App-2 in FIG. 3B, are provided by different vendors for example, each application provider can provide a classloader 312a, 312b for loading classes tailored to a particular application. Further, as shown by FIG. 3B, each application classloader 312a, 312b can be associated with one or more child classloaders, such as a web application classloader 314a, 314b, a connector classloader 316a, 316b and so forth. Embodiments can circumvent the necessity of placing these classes in the CLASSPATH statement by providing a <enable-global-access-to-classes> tag in a configuration, called weblogic-ra.xml in an embodiment. By default this tag is set to false. If the tag is set to true, however, all the classes loaded by a classloader will be made visible to an augmentable system classloader 318. These classes are then made visible to the methods and objects of the child applications.

Now with reference to FIG. 3C, in an embodiment and by way of example, in addition to application classloaders 322a, 322b, a resource adapter is provided with a resource adapter classloader 322c. Further, the resource adapter classloader 322c can have child classloaders, such as connector classloader 324c. By setting the enable-global-access-to-classes tag to true, classes loaded by a resource adapter classloader 324c will be made visible to an augmentable system classloader 328. The classes are then made visible to the methods and objects of the child applications.

In an embodiment, the resource adapter may be packaged within an archive format file (EAR). The common classes may be packaged into the APP-INF/lib directory. Multiple applications may be enabled to access a stand-alone resource adapter using the enable-global-access-to-classes tag described herein above.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for loading a class with a resource adapter classloader as discussed herein.

Figure 4:
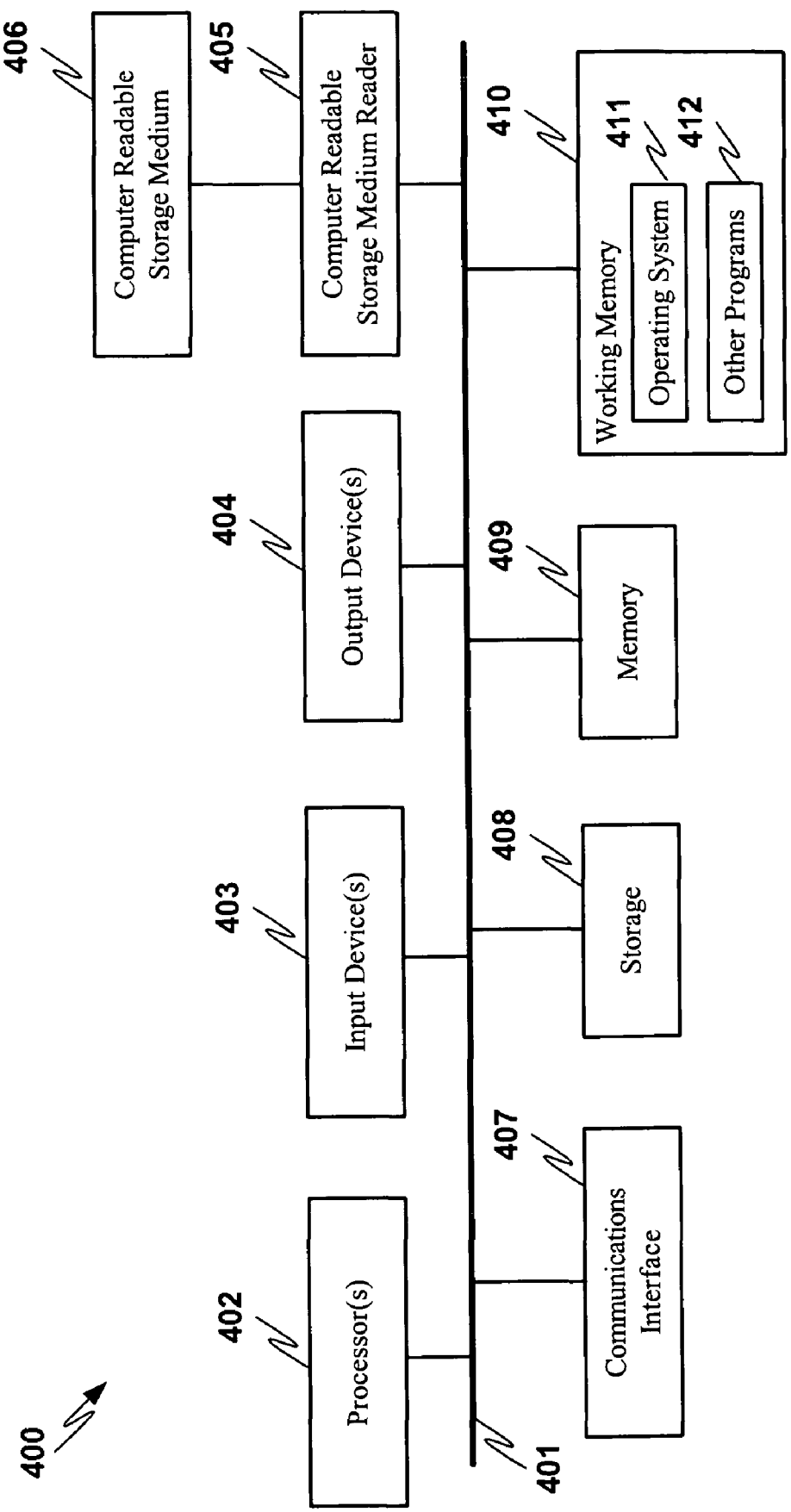
FIG. 4 is a hardware block diagram of an example computer system, which may be used to embody one or more components in an embodiment.

FIG. 4 illustrates an exemplary processing system 400, which can comprise one or more of the elements of FIG. 1. Turning now to FIG. 4, an exemplary computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 400 comprises components coupled via one or more communication channels (e.g., bus 401) including one or more general or special purpose processors 402, such as a Pentium®, Centrino®, Power PC®, digital signal processor ("DSP"), and so on. System 400 components also include one or more input devices 403 (such as a mouse, keyboard, microphone, pen, and so on), and one or more output devices 404, such as a suitable display, speakers, actuators, and so on, in accordance with a particular application. (It will be appreciated that input or output devices can also similarly include more specialized devices or hardware/software device enhancements suitable for use by the mentally or physically challenged.)

System 400 also includes a machine readable storage media reader 405 coupled to a machine readable storage medium 406, such as a storage/memory device or hard or removable storage/memory media; such devices or media are further indicated separately as storage 408 and memory 409, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 407 may also be included, such as a modem, DSL, infrared, RF or other suitable transceiver, and so on for providing inter-device communication directly or via one or more suitable private or public networks or other components that may include but are not limited to those already discussed.

Working memory 410 further includes operating system ("OS") 411 elements and other programs 412, such as one or more of application programs, mobile code, data, and so on for implementing system 400 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the JAVA™ 2 Platform, Enterprise Edition ("J2EE") or other programming languages in accordance with the requirements of a particular application. Other programs 412 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 408 or memory 409) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for loading a class, the method comprising:
providing an augmentable system class loader having a first class loader and a second class loader hierarchically located below the augmentable system class loader, wherein the first class loader is independent of the second class loader with respect to visibility of classes loaded by said first class loader and said second class loader;
detecting an indicator specifying that the class loaded by the first class loader is to be made accessible to the second class loader;
making the class loaded by the first class loader visible to the augmentable system class loader;
receiving a request to load the class by the second class loader; and
permitting the second class loader to access the class loaded by the first class loader by way of the augmentable system class loader.

2. The method of claim 1, wherein detecting the indicator, further comprises:
detecting that a tag indicating that the class loaded by the first class loader is to be made accessible to the second class loader has been set to true.

3. The method of claim 1, further comprising:
loading the class using the first class loader; and
providing access to the class independent of a CLASSPATH associated with a system class loader.

4. The method of claim 3, wherein loading the class using the first class loader comprises:
loading the class into a cache using the first class loader.

5. The method of claim 1, further comprising:
organizing the class with other classes according to rules defining a scope for classes associated with each class loader.

6. The method of claim 5, further comprising:
organizing the scope for classes associated with each class loader according to a hierarchy.

7. A machine-readable storage medium carrying one or more sequences of instructions for loading a class, wherein said instructions executed by one or more processors, causing the one or more processors to carry out the steps of:
providing an augmentable system class loader having a first class loader and a second class loader hierarchically located below the augmentable system class loader, wherein the first class loader is independent of the second class loader with respect to visibility of classes loaded by said first class loader and said second class loader;
detecting an indicator specifying that the class loaded by the first class loader is to be made accessible to at the second class loader;
making the class loaded by the first class loader visible to the augmentable system class loader;
receiving a request to load the class by the second class loader; and
permitting the second class loader to access the class loaded by the first class loader by way of the augmentable system class loader.

8. The machine-readable storage medium as recited in claim 7, wherein the instructions for carrying out the step of detecting the indicator further include instructions for carrying out the step of:
detecting that a tag indicating that the class loaded by the first class loader is to be made accessible to the second class loader has been set to true.

9. The machine-readable storage medium as recited in claim 7, further comprising instructions for carrying out the steps of:
loading the class by the first class loader; and
providing access to the class independent of a CLASSPATH associated with the system class loader.

10. The machine-readable storage medium as recited in claim 9, wherein the instructions for carrying out the step of loading the class using the first class loader further include instructions for carrying out the step of:
loading the class into a cache using the first class loader.

11. The machine-readable storage medium as recited in claim 7, further comprising instructions for carrying out the step of:
organizing the class with other classes according to rules defining a scope for classes associated with each class loader.

12. The machine-readable storage medium as recited in claim 7, further comprising instructions for carrying out the step of:
organizing the scope for classes associated with each class loader according to a hierarchy.

13. A resource adapter apparatus, the apparatus comprising:
a cache memory;
an augmentable system class loader having a first class loader and a second class loader to load instances of classes into the cache memory, wherein the first class loader and the second class loader are hierarchically located under the augmentable system class loader, and wherein the first class loader is independent of the second class loader with respect to visibility of classes loaded by said first class loader and said second class loader;
a mechanism to detect an indicator specifying that at least one class loaded by the first class loader is to be made accessible to the second class loader;
wherein the class loaded by the first class loader is made visible to the augmentable system class loader;
wherein a request to load the class is received by the second class loader; and
wherein the second class loader is permitted to access the class loaded by the first class loader by way of the augmentable system class loader.

* * * * *

UNITED STATES PATENT AND TRADEMARK OFFICE
CERTIFICATE OF CORRECTION

| | | |
|---|---|---|
| PATENT NO. | : 7,788,660 B2 | |
| APPLICATION NO. | : 11/281968 | |
| DATED | : August 31, 2010 | |
| INVENTOR(S) | : Codanda Ganapathy Chinnappa et al. | |

It is certified that error appears in the above-identified patent and that said Letters Patent is hereby corrected as shown below:

In column 9, line 51, in claim 7, after "to" delete "at".

Signed and Sealed this
Twenty-sixth Day of July, 2011

David J. Kappos
*Director of the United States Patent and Trademark Office*